United States Patent
Shivarudrappa et al.

(10) Patent No.: US 12,384,548 B2
(45) Date of Patent: Aug. 12, 2025

(54) COWL HOOP LATCH ASSEMBLY

(71) Applicant: Rohr, Inc., Chula Vista, CA (US)

(72) Inventors: Shashidhar Shivarudrappa, Bangalore (IN); Ramesh Maheshwarappa, Bangalore (IN); Sangareddy Challamreddy, Bidar (IN)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/241,697

(22) Filed: Sep. 1, 2023

(65) Prior Publication Data

US 2024/0076911 A1   Mar. 7, 2024

(30) Foreign Application Priority Data

Sep. 2, 2022 (IN) .............................. 202211050200

(51) Int. Cl.
| | |
|---|---|
| *B64D 29/06* | (2006.01) |
| *E05B 81/08* | (2014.01) |
| *E05B 81/18* | (2014.01) |
| *F01D 25/24* | (2006.01) |
| *B64D 29/08* | (2006.01) |

(52) U.S. Cl.
CPC .............. *B64D 29/06* (2013.01); *E05B 81/08* (2013.01); *E05B 81/18* (2013.01); *F01D 25/24* (2013.01); *B64D 29/08* (2013.01)

(58) Field of Classification Search
None
See application file for complete search history.

(56) References Cited

U.S. PATENT DOCUMENTS

| | | | |
|---|---|---|---|
| 8,413,346 B2 | 4/2013 | Vauchel | |
| 8,757,546 B2 | 6/2014 | Porte | |
| 9,003,810 B2 | 4/2015 | Porte | |
| 9,239,030 B2 | 1/2016 | Mercier | |

(Continued)

FOREIGN PATENT DOCUMENTS

EP   1764499 B1   12/2017

OTHER PUBLICATIONS

IQS Directory (Accessed on Sep. 3, 2024—Available since Aug. 12, 2021—https://www.iqsdirectory.com/articles/electric-coil/solenoid-coils.html) (Year: 2021).*

(Continued)

*Primary Examiner* — Juan G Flores
(74) *Attorney, Agent, or Firm* — Getz Balich LLC (57) ABSTRACT

A nacelle for a gas turbine engine includes a fixed nacelle portion, a cowl panel, and a latch assembly. The fixed nacelle portion extends circumferentially about an axial centerline. The cowl panel is axially adjacent the fixed nacelle portion. The cowl panel is moveable relative to the fixed nacelle portion between an open position and a closed position. The latch assembly includes a first latch portion and a second latch portion. The first latch portion is mounted to the cowl panel. The first latch portion includes a pin configured for translation along a pin axis between an extended pin position and a retracted pin position. The second latch portion is mounted to the fixed nacelle portion. The second latch portion includes a pin guide. The pin guide is configured to receive and engage the pin with the pin in the extended position and the cowl panel in the closed position.

9 Claims, 7 Drawing Sheets

(56) References Cited

U.S. PATENT DOCUMENTS

| | | | | |
|---|---|---|---|---|
| 9,643,714 | B2* | 5/2017 | Bulin | B64C 7/02 |
| 10,556,701 | B2* | 2/2020 | Schrell | B64D 33/02 |
| 2011/0174930 | A1 | 7/2011 | Porte | |
| 2012/0097261 | A1 | 4/2012 | Porte | |
| 2015/0110619 | A1* | 4/2015 | Bulin | B64D 29/06 |
| | | | | 415/213.1 |
| 2018/0297713 | A1* | 10/2018 | Schrell | B64D 45/00 |
| 2020/0339272 | A1 | 10/2020 | Shivarudrappa | |

OTHER PUBLICATIONS

Masaeli (Robot Mechanisms and Mechanical Devices Illustrated—McGraw Hill; Jul. 2012) (Year: 2012).*
EP Search Report for EP Patent Application No. 23194953.8 dated Dec. 20, 2023.

* cited by examiner

COWL HOOP LATCH ASSEMBLY

This application claims priority to Indian Patent Appln. No. 202211050200 filed Sep. 2, 2022 which is hereby incorporated herein by reference in its entirety.

BACKGROUND

1. Technical Field

This disclosure relates generally to cowl panels for a propulsion assembly nacelles, and more particularly to hoop latch assemblies for securing moveable nacelle cowl panels.

2. Background Information

A propulsion assembly, such as that used for aircraft propulsion, may include a nacelle configured to provide an exterior housing for the propulsion assembly. The nacelle may include one or more cowl sections (e.g., a fan cowl, a thrust reverser cowl, etc.). The cowl sections may include one or more movable cowl panels configured to provide access to internal propulsion assembly components. The cowl panels may experience radial movement during flight, which radial movement may impact operation of the propulsion assembly. Various types and configurations of cowl panels are known in the art. While these known cowl panels have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a nacelle for a gas turbine engine includes a fixed nacelle portion, a cowl panel, and a latch assembly. The fixed nacelle portion extends circumferentially about an axial centerline. The cowl panel is axially adjacent the fixed nacelle portion. The cowl panel is moveable relative to the fixed nacelle portion between an open position and a closed position. The latch assembly includes a first latch portion and a second latch portion. The first latch portion is mounted to the cowl panel. The first latch portion includes a pin configured for translation along a pin axis between an extended pin position and a retracted pin position. The second latch portion is mounted to the fixed nacelle portion. The second latch portion includes a pin guide. The pin guide is configured to receive and engage the pin with the pin in the extended position and the cowl panel in the closed position.

In any of the aspects or embodiments described above and herein, the first latch portion may include a frame and a spring. The frame may extend circumferentially about the pin axis and surround the pin. The spring may be positioned between the frame and the pin. The spring may be configured to bias the pin in the extended position.

In any of the aspects or embodiments described above and herein, the first latch portion may include a solenoid coil surrounding the pin. The solenoid coil may be configured to effect translation of the pin along the pin axis from the extended position to the retracted position with the solenoid coil in an energized condition.

In any of the aspects or embodiments described above and herein, the pin guide may include pin guide body including a front surface and a rear surface. The pin guide body may form a pin aperture extending through the front surface. The pin aperture may be configured to receive the pin. The front surface may be configured as a curved surface.

In any of the aspects or embodiments described above and herein, the first latch portion may include an axial locator portion and the second latch portion may include an axial locator receptacle. The axial locator receptacle may be configured to engaged the axial locator portion to maintain an axial position of the cowl panel, in the closed position, relative to the fixed nacelle portion.

In any of the aspects or embodiments described above and herein, the latch assembly may be one of a plurality of latch assemblies. The plurality of latch assemblies may be circumferentially distributed along the fixed nacelle portion and the cowl panel.

In any of the aspects or embodiments described above and herein, the fixed nacelle portion may be an air inlet of the nacelle, the cowl panel may be a fan cowl panel, and the fixed nacelle portion may be disposed axially forward of the cowl panel.

In any of the aspects or embodiments described above and herein, the pin may include a head and a shaft. The head may be circumferentially enlarged relative to the shaft.

According to another aspect of the present disclosure, a latch assembly includes a bracket and a pin assembly. The bracket includes a bracket body including a mount portion, a pin support portion, and an axial locator portion. The pin support portion and the axial locator portion extend outward from the mount portion. The axial locator portion is disposed adjacent the pin support portion. The pin assembly includes a pin control device and a pin. The pin control device is mounted to the pin support portion. The pin control device surrounds the pin. The pin control device is configured to effect translation of the pin along a pin axis between an extended position and a retracted position.

In any of the aspects or embodiments described above and herein, the pin control device may include a solenoid coil surrounding the pin. The solenoid coil may be configured to effect translation of the pin along the pin axis from the extended position to the retracted position with the solenoid coil in an energized condition.

In any of the aspects or embodiments described above and herein, the pin control device may include a spring surrounding the pin. The spring may be configured to bias the pin in the extended position.

In any of the aspects or embodiments described above and herein, the mount portion may extend between and to a first axial end and a second axial end. The mount portion may further extend between and to a first circumferential end and a second circumferential end. The pin support portion may be disposed at the first circumferential end. The axial locator portion may be disposed circumferentially between the pin control device and the second circumferential end.

In any of the aspects or embodiments described above and herein, the axial locator portion may extend along the second axial end.

In any of the aspects or embodiments described above and herein, each of the pin support portion and the axial locator portion may extend substantially orthogonally from the mount portion.

In any of the aspects or embodiments described above and herein, the pin support portion may form a pin aperture and the pin may be configured to translate within the pin aperture along the pin axis.

According to another aspect of the present disclosure, a nacelle for a gas turbine engine includes an air inlet, a cowl panel, and a latch assembly. The air inlet extends circumferentially about an axial centerline. The air inlet extends axially between and to a leading inlet end and a trailing inlet end. The air inlet includes an inner barrel panel, an outer barrel panel, and a bulkhead. The bulkhead extends radially between and connects the inner barrel panel and the outer barrel panel at the trailing inlet end. The cowl panel extends axially between and to a leading panel end and a trailing panel end. The leading panel end is axially adjacent the trailing inlet end. The cowl panel is moveable relative to the air inlet between an open position and a closed position. The latch assembly includes a first latch portion and a second latch portion. The first latch portion is mounted to the cowl panel. The first latch portion includes a pin configured for translation along a pin axis between an extended pin position and a retracted pin position. The second latch portion is mounted to the air inlet. The second latch portion is configured to receive and engage the pin with the pin in the extended position.

In any of the aspects or embodiments described above and herein, the second latch portion may be mounted to the bulkhead.

In any of the aspects or embodiments described above and herein, the second latch portion may include a pin guide. The pin guide may include a pin guide body and a pin aperture. The pin guide body may include a front surface and a rear surface opposite the front surface. The front surface may be configured as a curved surface. The rear surface may be mounted to the bulkhead.

In any of the aspects or embodiments described above and herein, the front surface may have a convex curved shape.

In any of the aspects or embodiments described above and herein, the latch assembly may be configured such that the pin, in the extended position, slides along the front surface to the pin aperture as the cowl panel is moved from the open position to the closed position.

The present disclosure, and all its aspects, embodiments and advantages associated therewith will become more readily apparent in view of the detailed description provided below, including the accompanying drawings.

DETAILED DESCRIPTION

Figure 1:
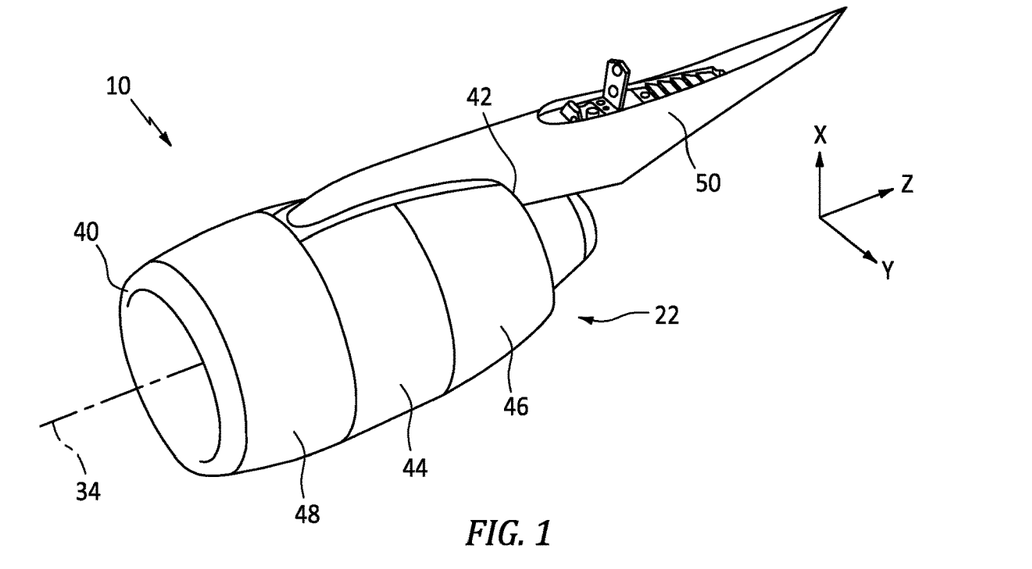
FIG. 1 illustrates a perspective view of an aircraft propulsion assembly, in accordance with one or more embodiments of the present disclosure.
Figure 2:
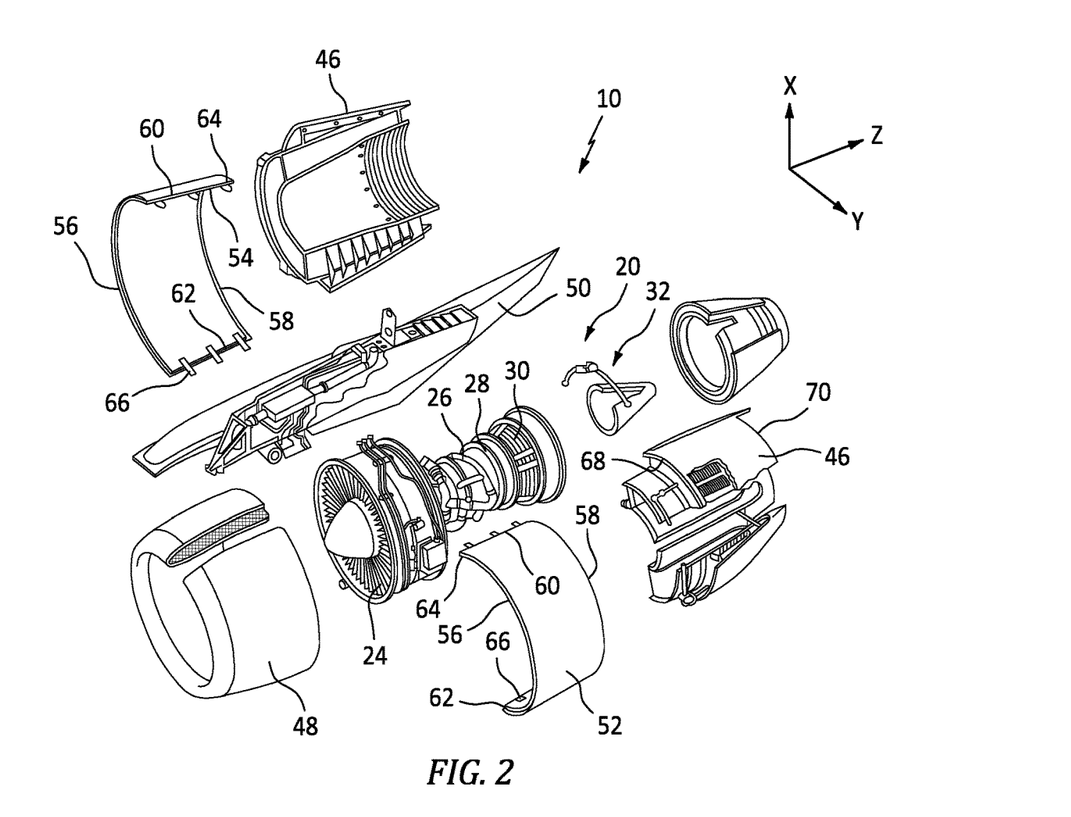
FIG. 2 illustrates an exploded view of an aircraft propulsion assembly, in accordance with one or more embodiments of the present disclosure.

FIGS. 1-2 illustrate a propulsion assembly 10 for an aircraft. The propulsion assembly 10 of FIGS. 1 and 2 includes a gas turbine engine 20 and a nacelle 22. The gas turbine engine 20 of FIGS. 1 and 2 is configured as a multi-spool turbofan gas turbine engine for the aircraft propulsion system 10. However, it should be understood that aspects of the present disclosure may be equally applicable to other configurations of gas turbine engine propulsion systems (e.g., those including a turboshaft gas turbine engine, a turboprop gas turbine engine, a turbojet gas turbine engine, a propfan gas turbine engine, an open rotor gas turbine engine, etc.) as well as other types of propulsion systems which do not include gas turbine engines (e.g., an electric-fan propulsion system, an electric-prop propulsion system, etc.).

The gas turbine engine 20 of FIGS. 1 and 2 includes a fan 24, a compressor section 26, a combustor section 28, a turbine section 30, and an exhaust section 32 disposed along an axial centerline 34 of the propulsion assembly 10. In operation, the fan 24 draws and directions ambient air into the propulsion system 10. The air may be divided into a core flow path and a bypass flow path. Each of the core flow path and the bypass flow path may be annular flow paths extending circumferentially about (e.g., completely around) the axial centerline 34. The core flow path extends through the core of the gas turbine engine 20. Air flow along the core flow path is directed through the compressor section 26, the combustor section 28, the turbine section 30, and the exhaust section 32. The compressor section 26 increases the pressure of the air along the core flow path and directs the air into the combustor section 28 where the air mixed with fuel and ignited. The combustion gas resulting from the combusted fuel and air mixture flows through the turbine section 30 causing one or more bladed turbine rotors to rotate and drive one or more rotors (e.g., bladed compressor rotors) and the fan 24 via one or more shafts. Exhaust gases exiting the turbine section 30 are directed out of the gas turbine engine 20 through the exhaust section 32. The bypass flow path extends through the propulsion assembly 10 outside of the core of the gas turbine engine 20. Air flow along the bypass flow path may be directed through the propulsion assembly 10 by one or more bypass ducts.

The nacelle 22 is configured to house and provide an aerodynamic cover for the gas turbine engine 20. The nacelle 22 extends axially along the axial centerline 34 between and to an upstream end 40 of the nacelle 22 and a downstream end 42 of the nacelle 22. The nacelle 22 extends circumferentially about (e.g., completely around) the axial centerline 34. The nacelle 22 may form at least a portion (e.g., an outer radial portion) of the bypass flow path through the propulsion assembly 10.

The nacelle 22 of FIGS. 1 and 2 includes a fan cowl 44, a thrust reverser 46, and an air inlet 48. The nacelle 22 may be coupled to a pylon 50, which pylon 50 may be configured to mount the nacelle 22, and thereby the propulsion assembly 10, to an aircraft wing or aircraft body. The air inlet 48 of FIGS. 1 and 2 extends between (e.g., axially between) and to the upstream end 40 and the fan cowl 44. The thrust reverser 46 of FIGS. 1 and 2 extends between (e.g., axially between) and to the downstream end 42 and the fan cowl 44.

The fan cowl 44 is configured to generally surround the fan 24. The fan cowl 44 of FIGS. 1 and 2 includes a first cowl panel 52 and a second cowl panel 54. Each of the first cowl panel 52 and the second cowl panel 54 include a leading end 56, a trailing end 58, a first circumferential end 60, and a second circumferential end 62. The first cowl panel 52 and the second cowl panel 54 may be hingedly coupled to the pylon 50 or to a fixed portion of the fan cowl 44 at (e.g., on, adjacent, or proximate) the first circumferential end 60. For example, the first cowl panel 52 and the second cowl panel 54 may each include one or more hinges 64 (e.g., gooseneck hinges). Each of the first cowl panel 52 and the second cowl panel 54 are configured to move (e.g., rotate) relative to the pylon 50 or a fixed portion of the fan cowl 44 between an open position and a closed position. As used herein, the term "closed position" will be used to refer to the first cowl panel 52 and/or the second cowl panel 54 in a position so as to form a portion of a substantially continuous exterior surface of the nacelle 22 (e.g., the first cowl panel 52 and/or the second cowl panel 54 are positioned for flight). As used herein, the term "open position" will be used to refer to the first cowl panel 52 and/or the second cowl panel 54 in a position other than the closed position (e.g., the first cowl panel 52 and/or the second cowl panel 54 are partially open, fully open, etc.). In the open position, each of the first cowl panel 52 and the second cowl panel 54 are configured to allow access (e.g., for maintenance) to internal components of the propulsion assembly 10, for example, components of the gas turbine engine 20.

In the closed position, the first cowl panel 52 and the second cowl panel 54 may be secured to one another, thereby preventing the first cowl panel 52 and the second cowl panel 54 from moving to the open position. For example, each of the first cowl panel 52 and the second cowl panel 54 may include one or more latches 66 at the second circumferential end 62. The latches 66 may be configured to fixedly engage the first cowl panel 52 with the second cowl panel 54 at the respective second circumferential ends 62 of the first cowl panel 52 and the second cowl panel 54.

The thrust reverser 46 of FIGS. 1 and 2 extends between (e.g., axially between) and to a leading end 68 of the thrust reverser 46 and a trailing end 70 of the thrust reverser 46. The thrust reverser 46 may be formed by a plurality of circumferential portions (e.g., thrust reverser cowls). The thrust reverser 46 may include one or more moveable (e.g., translatable, rotatable, etc.) components configured to redirect gas flow along the bypass flow path and/or the core flow path to provide deceleration (e.g., reverser thrust) for an aircraft associated with the propulsion assembly 10.

Figure 3:
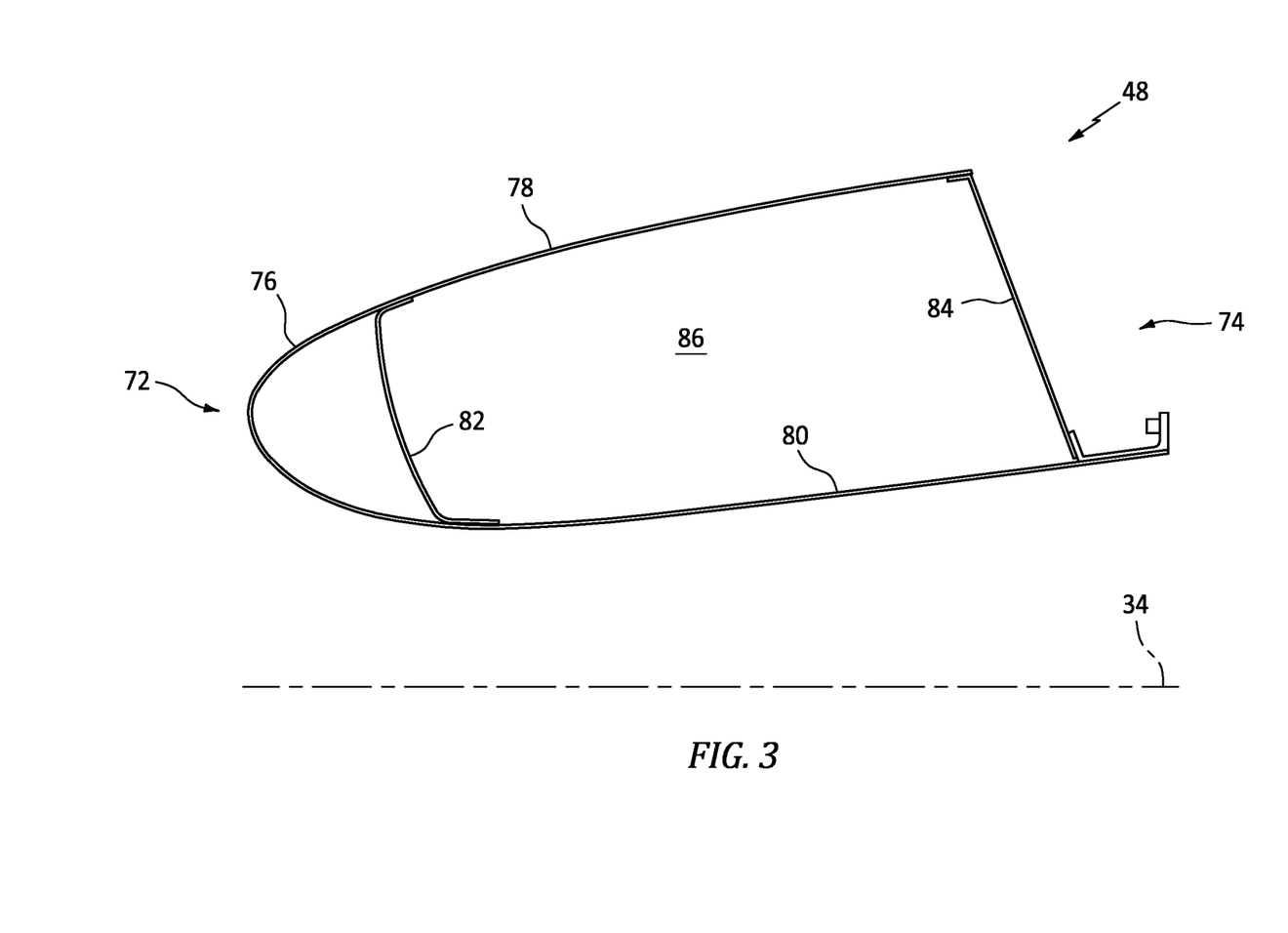
FIG. 3 illustrates a front cutaway view of portions of an aircraft propulsion assembly, in accordance with one or more embodiments of the present disclosure.

FIG. 3 illustrates a cutaway view of a circumferential portion of the air inlet 48. The air inlet 48 extends between (e.g., axially between) and to a leading end 72 of the air inlet 48 and a trailing end 74 of the air inlet 48. The leading end 72 may be coincident with the upstream end 40 (see FIG. 1). The air inlet 48 of FIG. 3 includes a lip skin 76, an outer barrel panel 78, an inner barrel panel 80, a forward bulkhead 82, and an aft bulkhead 84. The lip skin 76 is arcuately shaped (e.g., elliptically shaped, oval shaped, U-shaped, etc.) to form the leading end 72 for the air inlet 48. The lip skin 76 extends between and connects the outer barrel panel 78 and the inner barrel panel 80. The outer barrel panel 78 and the inner barrel panel 80 extend from the lip skin 76 to the trailing end 74. The outer barrel panel 78 forms an outer radial portion (e.g., an exterior portion) of the air inlet 48. The inner barrel panel 80 is radially spaced inward of the outer barrel panel 78. The outer barrel panel 78 and the inner barrel panel 80 form a cavity 86 (e.g., an annular cavity) radially between the outer barrel panel 78 and the inner barrel panel 80. The inner barrel panel 80 forms an inner radial portion (e.g., an interior portion) of the air inlet 48. The inner barrel panel 80 may, therefore, form a portion of the bypass flow path through the propulsion assembly 10 (see FIG. 2). The forward bulkhead 82 may be configured as an annular bulkhead which extends between (e.g., radially between) and connects the outer barrel panel 78 and the inner barrel panel 80 at (e.g., on, adjacent, or proximate) the lip skin 76. The aft bulkhead 84 may be configured as an annular bulkhead which extends between (e.g., radially between) and connects the outer barrel panel 78 and the inner barrel panel 80 at (e.g., on, adjacent, or proximate) the trailing end 74.

Figure 4:
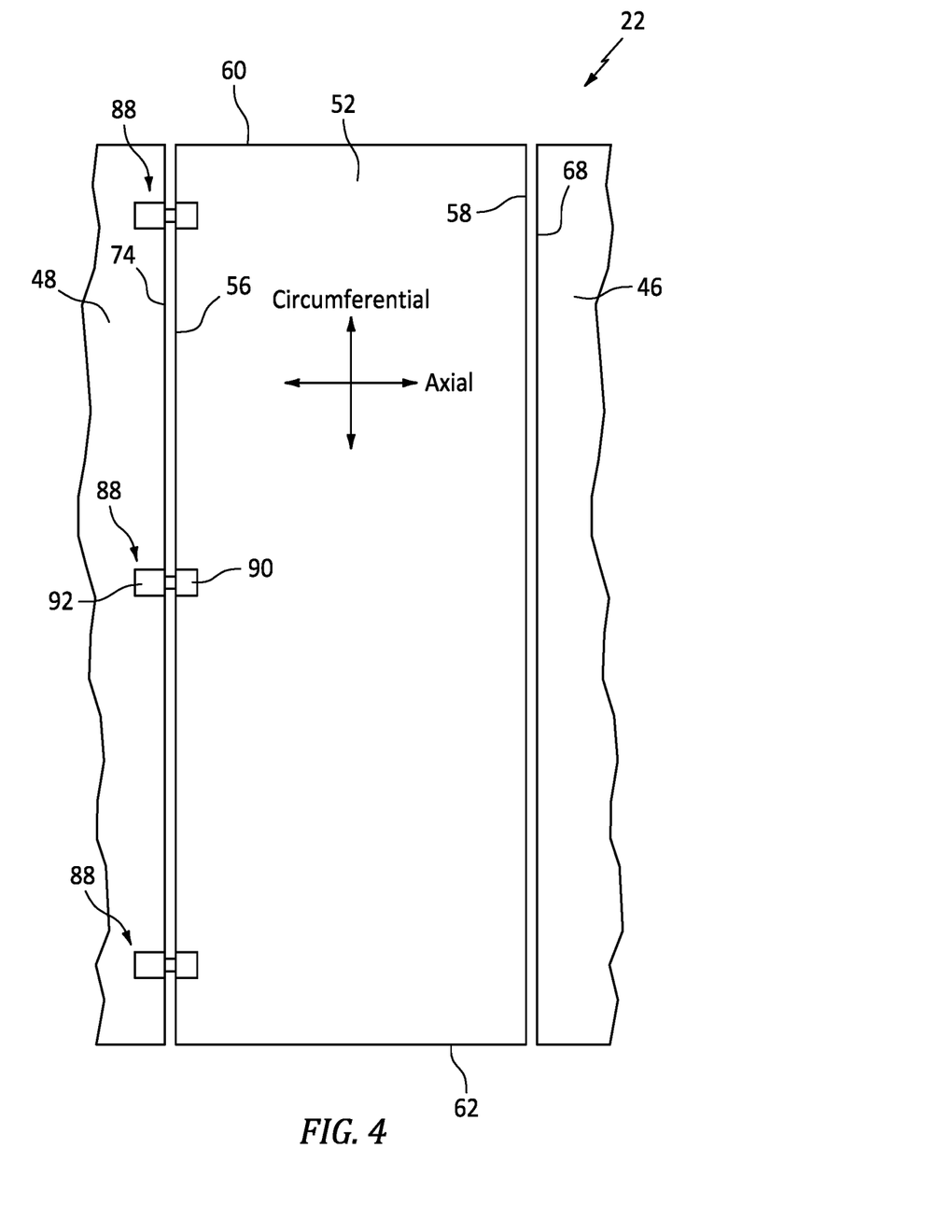
FIG. 4 illustrates a flattened view of portions of a nacelle for an aircraft propulsion assembly, in accordance with one or more embodiments of the present disclosure.

FIG. 4 illustrated a flattened view of portions of the nacelle 22 including the first cowl panel 52 (e.g., in the closed position), the thrust reverser 46, and the air inlet 48. The leading end 56 of the first cowl panel 52 is positioned adjacent the trailing end 74 of the air inlet 48. The trailing end 58 of the first cowl panel 52 is positioned adjacent the leading end 68 of the thrust reverser 46. As previously discussed, the first cowl panel 52 is configured to move (e.g., rotate) between the open position and the closed position about one or more hinges (see FIG. 2) disposed at (e.g., on, adjacent, or proximate) the first circumferential end 60. The first cowl panel 52 may also, therefore, be configured to move relative to the adjacent thrust reverser 46 and air inlet 48. While FIG. 4 illustrates the first cowl panel 52, the description herein with respect to FIG. 4 should be understood to also apply to the second cowl panel 54.

During operation of conventional propulsion assemblies, it has been observed that moveable cowl panels (e.g., cowl panels of a fan cowl) may experience deformation, radial displacement, and/or other movement (e.g., "scooping") relative to adjacent portions of the nacelle. Scooping movement of the cowl panels may cause or enlarge air gaps between the cowl panels and adjacent portions of the nacelle (e.g., an air inlet, a thrust reverser, etc.), which air gaps may allow external air (e.g., air radially outward of the nacelle) to enter the nacelle. This external air flow into the nacelle may result in increased fluid pressure in portions of the propulsion assembly (e.g., a fan cowl compartment). Additionally, scooping movement of the cowl panels may lead to erosion of the cowl panel leading ends due to increased exposure to external air flow.

The nacelle 22 of FIG. 4 includes one or more hoop latch assemblies 88 (hereinafter "latch assemblies") configured to prevent or reduce radially outward movement of the first cowl panel 52 and/or the second cowl panel 54 relative to surrounding portions of the nacelle 22. The latch assemblies 88 of FIG. 4 are disposed at (e.g., on, adjacent, or proximate) an interface between the leading end 56 and the trailing end 74. The latch assemblies 88 of FIG. 4 are circumferentially distributed along the interface between the leading end 56 and the trailing end 74. The latch assemblies 88 of FIG. 4 are configured to radially secure the first cowl panel 52 and/or the second cowl panel 54 to the axially adjacent air inlet 48. The nacelle 22 of FIG. 4 includes three latch assemblies 88, however, the present disclosure is not limited to any particular number of latch assemblies 88 for the first cowl panel 52 and/or the second cowl panel 54. Although FIG. 4 illustrates the latch assemblies 88 disposed at the interface of the leading end 56 and the trailing end 74, it should be understood that the latch assemblies 88 may additionally or alternatively be disposed at (e.g., on, adjacent, or proximate) an interface between the trailing end 58 and the leading end 68, to radially secure the first cowl panel 52 and/or the second cowl panel 54 to the axially adjacent thrust reverser 46.

Each latch assembly 88 includes a first latch portion 90 and a second latch portion 92. The first latch portion 90 of FIG. 4 is mounted to the first cowl panel 52 at (e.g., on, adjacent, or proximate) the leading end 56. The second latch portion 92 of FIG. 4 is mounted to the air inlet 48 at (e.g., on, adjacent, or proximate) the trailing end 74. As will be discussed in further detail, the first latch portion 90 is configured to selectively engage the second latch portion 92 to radially secure the first cowl panel 52 and/or the second cowl panel 54 to the axially adjacent air inlet 48.

Figure 5:
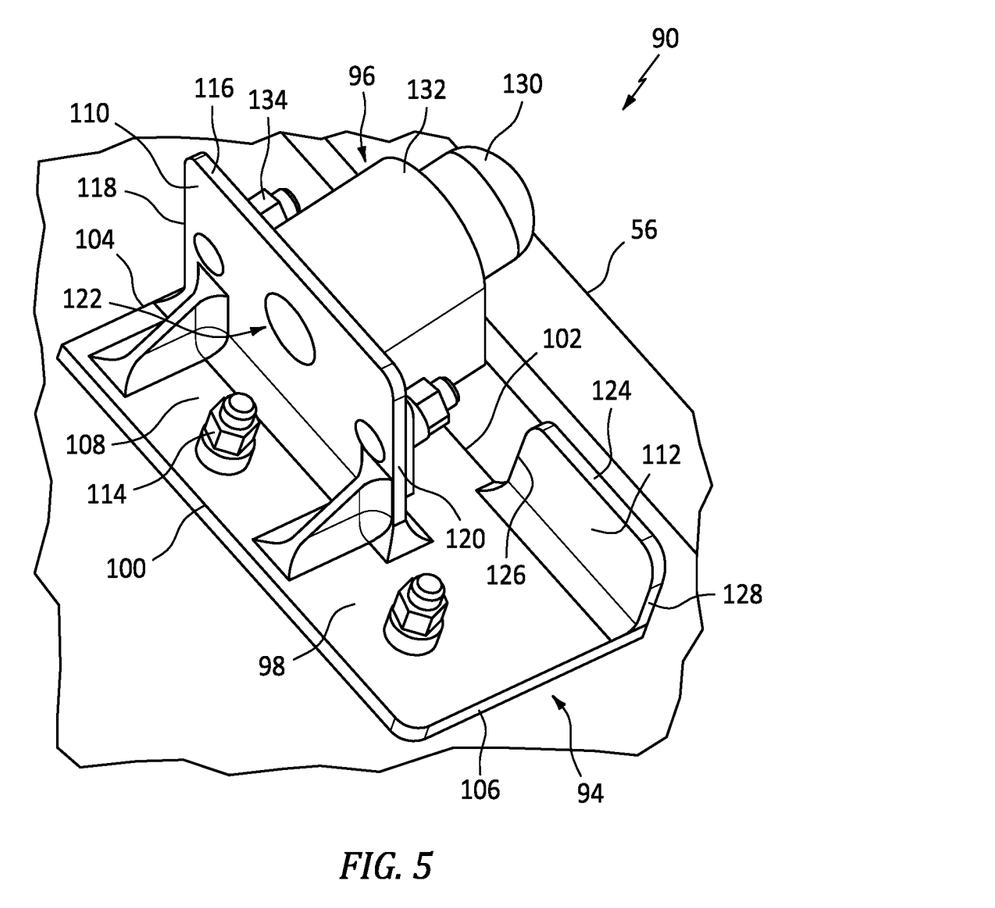
FIG. 5 illustrates a perspective view of a portion of a latch assembly, in accordance with one or more embodiments of the present disclosure.

FIG. 5 illustrates a perspective view of the first latch portion 90. The first latch portion 90 includes a bracket 94 and a pin assembly 96.

The bracket 94 of FIG. 5 includes a bracket body 98. The bracket body 98 extends between and to a first axial end 100 of the bracket body 98 and a second axial end 102 of the bracket body 98. The bracket body 98 further extends between and to a first circumferential end 104 of the bracket body 98 and a second circumferential end 106 of the bracket body 98. The bracket body 98 includes a mount portion 108 and a pin support portion 110. The bracket body 98 may additionally include an axial locator portion 112.

The mount portion 108 of FIG. 5 extends (e.g., axially extends) between and to the first axial end 100 and the second axial end 102. The second axial end 102 may be disposed at (e.g., on, adjacent, or proximate the leading end 56. The mount portion 108 of FIG. 5 further extends (e.g., circumferentially extends) between and to the first circumferential end 104 and the second circumferential end 106. The mount portion 108 of FIG. 5 is configured to be mounted to the first cowl panel 52 and/or the second cowl panel 54 (e.g., an interior surface of the first cowl panel 52 and/or the second cowl panel 54) at the leading end 56. The mount portion 108 of FIG. 5 is mounted to the first cowl panel 52 and/or the second cowl panel 54, for example, by one or more fasteners 114, however, the present disclosure is not limited to any particular mounting configuration for the mount portion 108.

The pin support portion 110 of FIG. 5 extends outward (e.g., orthogonal or substantially orthogonal (e.g., +/−ten degrees (10°) from orthogonal)) from the mount portion 108 to a distal end 116 of the pin support portion 110. The pin support portion 110 of FIG. 5 extends (e.g., circumferentially extends) between a first end 118 of the pin support portion 110 and a second end 120 of the pin support portion 110. The pin support portion 110 may extend from the first end 118 to the second end 120 in a direction extending between the first circumferential end 104 and the second circumferential end 106. The first end 118 may be disposed at (e.g., on, adjacent, or proximate) the first circumferential end 104. The second end 120 may be disposed between the first circumferential end 104 and the second circumferential end 106. The pin support portion 110 may be disposed between the first axial end 100 and the second axial end 102. The pin support portion 110 may form a pin aperture 122 which extends through the pin support portion 110.

The axial locator portion 112 of FIG. 5 extends outward (e.g., orthogonal or substantially orthogonal) from the mount portion 108 to a distal end 124 of the axial locator portion 112. The axial locator portion 112 of FIG. 5 extends (e.g., circumferentially extends) between a first end 126 of the axial locator portion 112 and a second end 128 of the axial locator portion 112. The axial locator portion 112 may extend between the first end 126 and the second end 128 at (e.g., on, adjacent, or proximate) and along the second axial end 102. The second end 128 may be disposed at (e.g., on, adjacent, or proximate) the second circumferential end 106. The axial locator portion 112 may, therefore, extend from the second circumferential end 106 a portion of a circumferential distance from the second circumferential end 106 to the first circumferential end 104.

The pin assembly 96 of FIG. 5 includes a pin 130 and a pin control device 132. The pin 130 is configured for translation (e.g., linear translation), relative to the pin control device 132, between an extended position and a retracted position. The pin control device 132 of FIG. 5 surrounds and supports the pin 130. The pin control device 132 is mounted to the pin support portion 110. The pin control device 132 may be mounted to the pin support portion 110, for example, by one or more fasteners 134, however, the present disclosure is not limited to any particular mounting configuration for the pin control device 132. The pin control device 132 extends outward from the pin control device 132 in a direction (e.g., an axial direction) toward or past the leading end 56. The pin control device 132 may be mounted to the pin support portion 110 at (e.g., on, adjacent, or proximate) the pin aperture 122 such that the pin 130 may extend through and move within the pin aperture 122.

Figure 6:
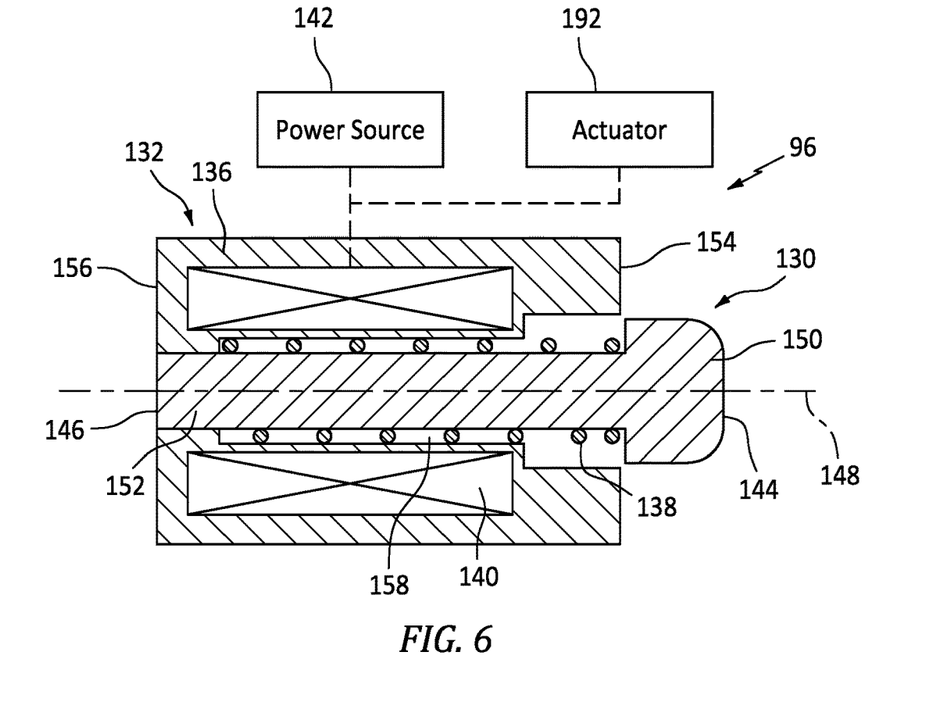
FIG. 6 illustrates a schematic cutaway view of the portion of the latch assembly of FIG. 5 in an engaged condition, in accordance with one or more embodiments of the present disclosure.
Figure 7:
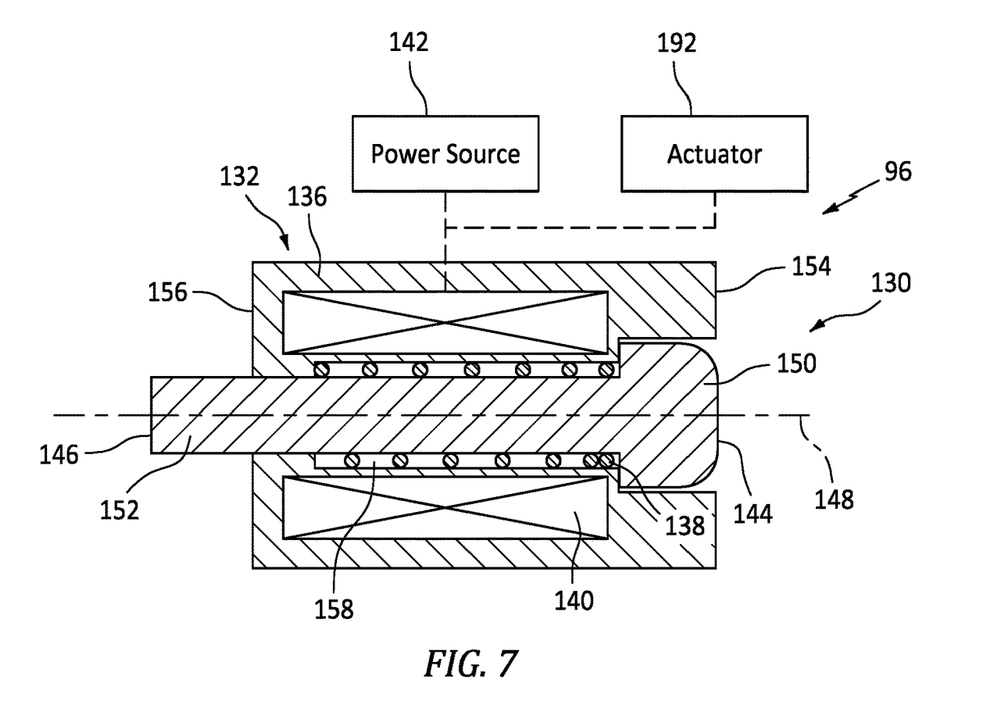
FIG. 7 illustrates a schematic cutaway view of the portion of the latch assembly of FIG. 5 in a disengaged condition, in accordance with one or more embodiments of the present disclosure.

FIGS. 6 and 7 illustrate schematic views of the pin assembly 96 including the pin 130 and the pin control device 132. FIG. 6 illustrates the pin 130 in an extended position. FIG. 7 illustrates the pin 130 in a retracted position. The pin control device 132 of FIGS. 6 and 7 includes a frame 136, a spring 138, a solenoid coil 140, and a power source 142.

The pin 130 extends between and to a first end 144 of the pin 130 and a second end 146 of the pin 130 along a pin axis 148. The pin 130 is configured for translation along the pin axis 148 between the extended position and the retracted position. The pin 130 includes a head 150 and a shaft 152. The head 150 is disposed at (e.g., on, adjacent, or proximate) the first end 144. The head 150 may be enlarged (e.g., circumferentially enlarged) relative to the shaft 152. The shaft 152 extends from the head 150 to the second end 146. The shaft 152 may be configured as an armature for the solenoid coil 140 and may be made from or otherwise include a ferromagnetic material (e.g., iron, nickel, and/or cobalt).

The frame 136 is configured to house and support the pin 130, the spring 138, and the solenoid coil 140. The frame 136 may be mounted to the pin support portion 110, for example, by the fasteners 134 (see FIG. 5). The frame 136 extends along the pin axis 148 between and to a first end 154 of the frame 136 and a second end 156 of the frame 136. The frame 136 extends circumferential about (e.g., completely around) the pin axis 148. The frame 136 forms a pin aperture 158 which extends through the frame 136 from the first end 154 to the second end 156. The pin 130 is disposed within the pin aperture 158 and the pin 130 is configured for translation along the pin axis 148 within the pin aperture 158. The frame 136 may include one or more bushings configured to contact the pin 130, to facilitate reduced friction between the pin 130 and the frame 136 as the pin 130 translates within the frame 136.

The spring 138 is positioned within the pin aperture 158 and surrounds the shaft 152. The spring 138 extends axially along the pin axis 148 between and in contact with the frame 136 and the head 150. The spring 138 is configured to bias the pin 130 in the extended position, which extended position may, therefore, be a default position of the pin 130.

The solenoid coil 140 of FIGS. 6 and 7 is retained within the frame 136. The solenoid coil 140 surrounds the pin aperture 158 and the shaft 152. The solenoid coil 140 is configured as an electrically-conductive coil (e.g., a helical coil of wire), which electrically-conductive coil may generate a magnetic field in response to a flow of electrical current through the electrically-conductive coil. The solenoid coil 140 of FIGS. 6 and 7 is in electrical communication with the power source 142. Examples of the power source 142 may include, but are not limited to, a battery, an electrical generator, an auxiliary power unit (APU), and the like. The power source 142 is configured to selectively energize or deenergize the solenoid coil 140 to control a position of the pin 130. The power source 142 of FIGS. 6 and 7 includes actuator 192. The actuator 192 is configured to cause the power source 142 to selectively apply an electrical current to the solenoid coil 140 (e.g., to energize the solenoid coil 140) and/or to cause the power source 142 to selectively secure electrical current to the solenoid coil 140 (e.g., to deenergize the solenoid coil 140. Examples of the actuator 192 may include, but are not limited to, a push button, a switch, a breaker, or other suitable electrical control device. The actuator 192 may be located on the nacelle 22 (e.g., the first cowl panel 52 and/or the second cowl panel 54) or another suitable location of the propulsion assembly 10 or associated aircraft. The present disclosure, however, is not limited to any particular location or configuration of the actuator 192.

In the deenergized condition of the solenoid coil 140, the spring 138 may bias the pin 130 in the extended position such that the pin 130 extends outward from the frame 136 along the pin axis 148 (see FIG. 6). In the energized condition of the solenoid coil 140, the magnetic field generated by the solenoid coil 140 may cause the pin 130 (e.g., the shaft 152) to retract against the biasing force of the spring 138 along the pin axis 148. With the solenoid coil 140 in the energized condition, the pin 130 may, therefore, be retained in the retracted position (see FIG. 7). While the pin control device 132 of the present disclosure is described herein as including the solenoid coil 140 to effect translation of the pin 130, it should be understood that the present disclosure is not limited to any particular configuration of the pin control device 132 for controlling translation of the pin 130. For example, translation of the pin 130 along the pin axis 148 may alternatively be effected by a mechanical linkage system, a pneumatic system, a hydraulic system, an electro-mechanical actuation system, and the like.

Figure 8:
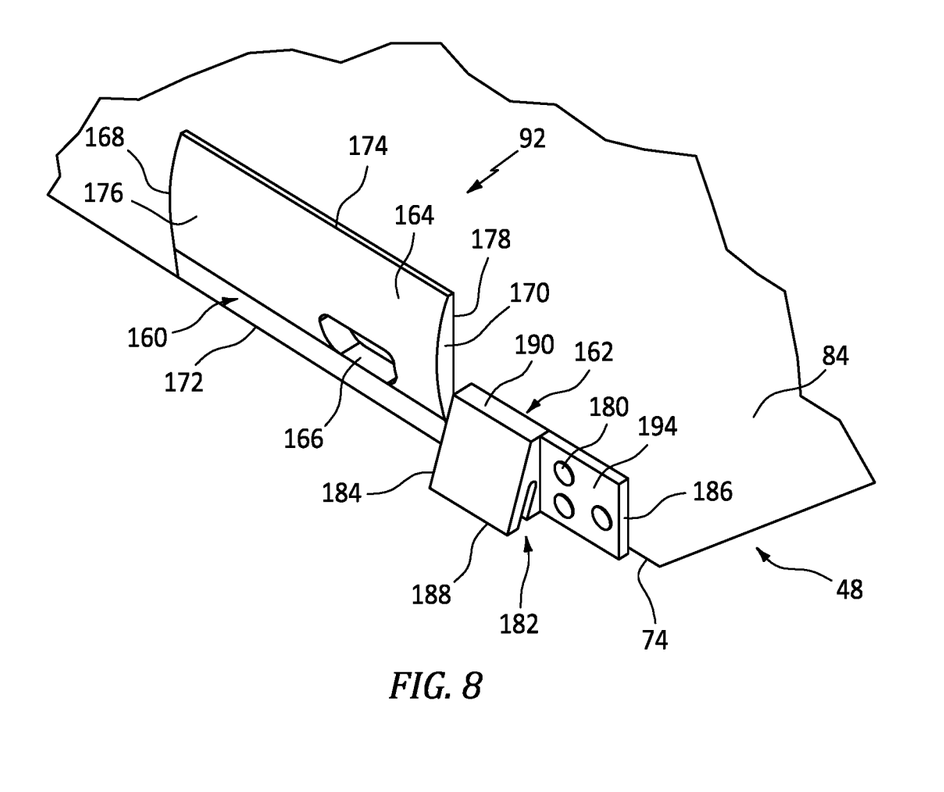
FIG. 8 illustrates a perspective view of another portion of the latch assembly, in accordance with one or more embodiments of the present disclosure.

FIG. 8 illustrates the second latch portion 92. The second latch portion 92 of FIG. 8 includes a pin guide 160. The second latch portion 92 may additionally include an axial locator receptacle 162.

The pin guide 160 of FIG. 8 includes a pin guide body 164 and a pin aperture 166. The pin guide body 164 extends (e.g., circumferentially extends) between and to a first circumferential end 168 of the pin guide body 164 and a second circumferential end 170 of the pin guide body 164. The pin guide body 164 further extends (e.g., radially extends) between and to a first radial end 172 of the pin guide body 164 and a second radial end 174 of the pin guide body 164. The pin guide body 164 of FIG. 8 includes a front surface 176 and a rear surface 178 opposite the front surface 176. The front surface 176 may be configured as a curved surface. For example, the pin guide body 164 of FIG. 8 has a convex curved shape extending from the first radial end 172 to the second radial end 174. The pin guide body 164 of FIG. 8 forms the pin aperture 166 through the pin guide body 164 from the front surface 176 toward or through the rear surface 178. As the cowl panel 52, 54 (see FIG. 1) is moved from the open position to the closed position, the pin 130 in the extended position (e.g., biased by the spring 138 (see FIGS. 6 and 7)) may slide along the curved front surface 176 to the pin aperture 166. The pin aperture 166 may be sized to provide a gap (e.g., a radial gap relative to the pin axis 148 (see FIGS. 6 and 7) between the pin 130 and the pin guide body 164, which the pin 130 inserted in the pin aperture 166. The gap may be sized to accommodate installation and/or manufacturing tolerances of the latch assembly 88 while allowing the pin 130 to be moved into or out of the pin aperture 130 with minimal or no friction.

The pin guide 160 of FIG. 8 is mounted to the air inlet 48 at (e.g., on, adjacent, or proximate) the trailing end 74. The pin guide 160 may be mounted on or proximate the aft bulkhead 84 at (e.g., on, adjacent, or proximate) an outer radial end of the aft bulkhead 84. For example, the pin guide 160 of FIG. 8 is mounted with the rear surface 178 contacting the aft bulkhead 84. The pin guide 160 may be mounted to the aft bulkhead 84 using any suitable mounting configuration including, but not limited to, one or more fasteners, bonding, welding, and the like. In some embodiments, the aft bulkhead 84 may include or otherwise form the pin guide 160.

The axial locator receptacle 162 of FIG. 8 includes a receptacle body 180 and an axial locator slot 182. The receptacle body 180 extends (e.g., circumferentially extends) between and to a first circumferential end 184 of the receptacle body 180 and a second circumferential end 186 of the receptacle body 180. The axial locator receptacle 162 further extends (e.g., radially extends) between and to a first radial end 188 of the receptacle body 180 and a second radial end 190 of the receptacle body 180. The receptacle body 180 forms the axial locator slot 182. The axial locator slot 182 of FIG. 8 is formed through the receptacle body 180 from the first radial end 188 toward the second radial end 190. The axial locator slot 182 may be configured as a circumferentially-extending slot which extends from the first circumferential end 184 toward the second circumferential end 186.

The axial locator receptacle 162 of FIG. 8 is mounted to the air inlet 48 at (e.g., on, adjacent, or proximate) the trailing end 74. The axial locator receptacle 162 of FIG. 8 is further mounted to the air inlet 48 adjacent (e.g., circumferentially adjacent) the pin guide 160. For example, the first circumferential end 184 may be mounted at (e.g., on, adjacent, or proximate) the second circumferential end 170. The axial locator receptacle 162 may be mounted on or proximate the aft bulkhead 84. For example, the axial locator receptacle 162 of FIG. 8 is mounted to the aft bulkhead 84 using one or more fasteners 194. The axial locator receptacle 162 of FIG. 8 is mounted so that the first radial end 188 is positioned radially outward of the second radial end 190, such that the axial locator slot 182 faces a radial exterior of the air inlet 48. For example, the first radial end 188 may be positioned at (e.g., on, adjacent, or proximate) a radial exterior of the air inlet 48.

Figure 9:
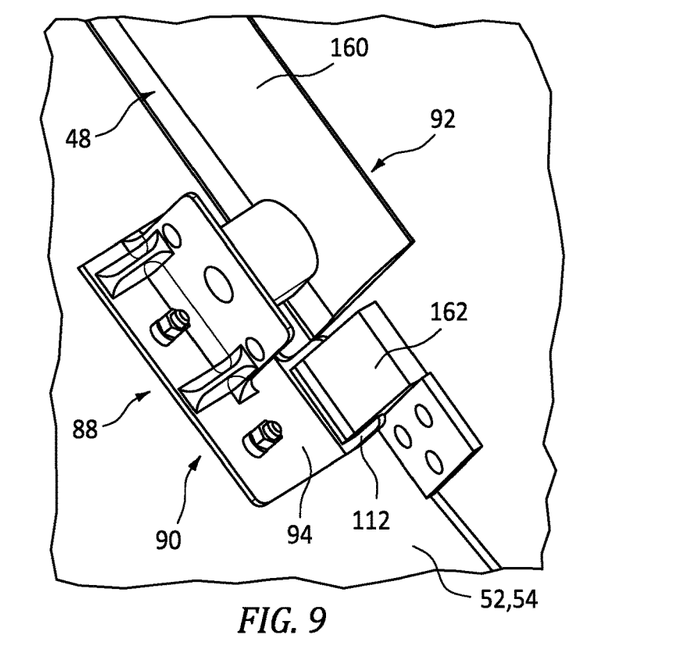
FIG. 9 illustrates a perspective view of the latch assembly, in accordance with one or more embodiments of the present disclosure.
Figure 10:
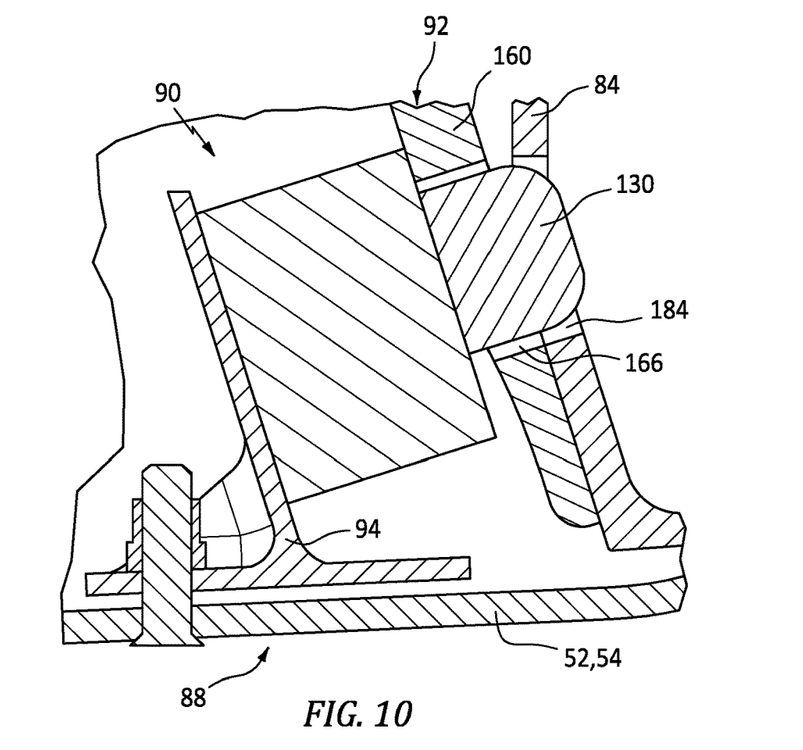
FIG. 10 illustrates a side cutaway view of the latch assembly, in accordance with one or more embodiments of the present disclosure.

FIGS. 9 and 10 illustrate the first latch portion 90 engaged with the second latch portion 92, with the cowl panel 52, 54 in the closed position. As shown in FIG. 10, the pin 130, in the extended position, is positioned within the pin aperture 166. The spring 138 (see FIGS. 6 and 7) biasing of the pin 130 in the extend position facilitates engagement of the pin 130 with the pin guide 160. With the pin 130 positioned within the pin aperture 166, radial movement of the respective cowl panel 52, 54 relative to the air inlet 48 is prevented or reduced at the circumferential location of the latch assembly 88. The axial locator portion 112 and corresponding axial locator receptacle 162 may facilitate axial retention of the cowl panel 52, 54 relative to the air inlet 48, thereby maintaining the engagement between the pin 130 and the pin guide 160 (e.g., maintaining the pin 130 within the pin aperture 166). The aft bulkhead 84 of FIG. 10 includes a pin aperture 184 coincident with the pin aperture 166, however, the present disclosure is not limited to the inclusion of a pin aperture in the aft bulkhead 84.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A nacelle for a gas turbine engine, the nacelle comprising:
    a fixed nacelle portion extending circumferentially about an axial centerline;
    a cowl panel axially adjacent the fixed nacelle portion, the cowl panel moveable relative to the fixed nacelle portion between an open position and a closed position; and
    a latch assembly including a first latch portion and a second latch portion, the first latch portion mounted to the cowl panel, the first latch portion including a pin configured for translation along a pin axis between an extended pin position and a retracted pin position, the second latch portion mounted to the fixed nacelle portion, the second latch portion including a pin guide, the pin guide configured to receive and engage the pin with the pin in the extended position and the cowl panel in the closed position;
    wherein the first latch portion includes an axial locator portion and the second latch portion includes an axial locator receptacle, the axial locator receptacle configured to engaged the axial locator portion to maintain an axial position of the cowl panel, in the closed position, relative to the fixed nacelle portion.

2. The nacelle of claim 1, wherein the first latch portion includes a solenoid coil surrounding the pin, the solenoid coil configured to effect translation of the pin along the pin axis from the extended position to the retracted position with the solenoid coil in an energized condition.

3. The nacelle of claim 1, wherein:
    the pin guide includes pin guide body including a front surface and a rear surface, the pin guide body forming a pin aperture extending through the front surface, the pin aperture configured to receive the pin; and
    the front surface is configured as a curved surface.

4. The nacelle of claim 1, wherein the first latch portion includes a frame and a spring, the frame extending circumferentially about the pin axis and surrounding the pin, the spring positioned radially between the frame and the pin, the spring configured to bias the pin in the extended position.

5. The nacelle of claim 1, wherein the latch assembly is one of a plurality of latch assemblies, the plurality of latch assemblies circumferentially distributed along the fixed nacelle portion and the cowl panel.

6. The nacelle of claim 1, wherein:
    the fixed nacelle portion is an air inlet of the nacelle;
    the cowl panel is a fan cowl panel; and
    the fixed nacelle portion is disposed axially forward of the cowl panel.

7. The nacelle of claim 1, wherein the pin includes a head and a shaft, the head being circumferentially enlarged relative to the shaft.

8. A nacelle for a gas turbine engine, the nacelle comprising:
    an air inlet extending circumferentially about an axial centerline, the air inlet extending axially between and to a leading inlet end and a trailing inlet end, the air inlet including an inner barrel panel, an outer barrel panel, and a bulkhead, the bulkhead extending radially between and connecting the inner barrel panel and the outer barrel panel at the trailing inlet end;
    a cowl panel extending axially between and to a leading panel end and a trailing panel end, the leading panel end axially adjacent the trailing inlet end, the cowl panel moveable relative to the air inlet between an open position and a closed position; and a latch assembly including a first latch portion and a second latch portion, the first latch portion mounted to the cowl panel, the first latch portion including a pin configured for translation along a pin axis between an extended pin position and a retracted pin position, the second latch portion mounted to the air inlet, the second latch portion configured to receive and engage the pin with the pin in the extended position, the second latch portion mounted to the bulkhead, the second latch portion including a pin guide, the pin guide including a pin guide body and a pin aperture, the pin guide body including a front surface and a rear surface opposite the front surface, the front surface configured as a curved surface, and the rear surface mounted to the bulkhead;

wherein the latch assembly is configured such that the pin, in the extended position, slides along the front surface to the pin aperture as the cowl panel is moved from the open position to the closed position.

9. The nacelle of claim 8, wherein the front surface has a convex curved shape.

\* \* \* \* \*